(12) United States Patent
Chapman

(10) Patent No.: US 12,192,428 B2
(45) Date of Patent: Jan. 7, 2025

(54) IR (INFRARED) MARK DESTROYED ON COPY

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 167 days.

(21) Appl. No.: 18/097,028

(22) Filed: Jan. 13, 2023

(65) Prior Publication Data

US 2024/0244151 A1 Jul. 18, 2024

(51) Int. Cl.
*H04N 1/32* (2006.01)
*G06T 1/00* (2006.01)

(52) U.S. Cl.
CPC ....... *H04N 1/32347* (2013.01); *G06T 1/0021* (2013.01)

(58) Field of Classification Search
CPC ............ H04N 1/32347; H04N 1/32309; G06T 1/0021
See application file for complete search history.

(56) References Cited

U.S. PATENT DOCUMENTS

| | | |
|---|---|---|
| 6,804,377 B2 | 10/2004 | Reed et al. |
| 7,852,515 B2 | 12/2010 | Eschbach et al. |
| 7,865,034 B2 | 1/2011 | So |
| 8,064,102 B1 | 11/2011 | Zhao et al. |
| 8,730,527 B2 | 5/2014 | Chapman et al. |
| 8,797,602 B2 | 8/2014 | Chapman et al. |
| 10,999,466 B1 | 5/2021 | Chapman |
| 2014/0337211 A1* | 11/2014 | Crist ..................... G07F 19/203 700/235 |

OTHER PUBLICATIONS

"RGB Color Model," Wikipedia, Retrieved from "https://en.wikipedia.org/w/index.php?title=RGB_color_model&oldid=1128337273"; page was last edited on Dec. 19, 2022, at 16:23 (UTC).
"CMYK Color Model," Wikipedia, Retrieved from "https://en.wikipedia.org/w/index.php?title=CMYK_color_model&oldid=1128975648"; page was last edited on Dec. 23, 2022, at 00:10 (UTC).
"CIELAB Color Space," Wikipedia, Retrieved from "https://en.wikipedia.org/w/index.php?title=CIELAB_color_space&oldid=1129787482", page was last edited on Dec. 27, 2022, at 03:39 (UTC).
"Xerox® Specialty Imaging: Fraud Deterrent Technology", https://www.xerox.com/en-us/digital-printing/fraud-deterrent-technology, 2022.

* cited by examiner

*Primary Examiner* — Christopher Wait
(74) *Attorney, Agent, or Firm* — Ortiz & Lopez, PLLC; Kermit D. Lopez; Luis M. Ortiz

(57) ABSTRACT

A security apparatus, method and system for rendering a security mark, can involve providing a security mark with a metameric pair of infrared inks. A spectral reflectance of two metameric inks among the metameric pair of inks differs for CMYK for K in infrared. A first metameric ink among the metameric pair of infrared inks can be configured to include more K than a second metameric ink among the metameric pair of infrared inks, wherein when a document containing the security mark is scanned, and the number of K pixels in the first metameric ink is filtered to destroy the security mark when viewed through an infrared camera.

20 Claims, 12 Drawing Sheets

IR (INFRARED) MARK DESTROYED ON COPY

TECHNICAL FIELD

Embodiments are related to image processing methods, systems and devices. Embodiments also relate to printing devices and techniques. Embodiments further relate to security devices such as watermarks and in particular, infrared watermarks.

BACKGROUND

In conventional printing processes that require security measures, a pattern color space having specialty imaging characteristics can be used to provide security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

In security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples include prescriptions, contracts, documents, coupons, and tickets. Typically, several specialty-imaging techniques can be used at various positions in a document. In addition, these security elements may in some cases conflict with the overall aesthetics of the document.

In the area of security printing, documents are protected from copying, forging, and counterfeiting using multiple techniques. Specialty Imaging is one such method of security printing which uses standard material such as papers inks and toners. Typically, security printing companies in the marketplace require special (expensive) materials. An example document is a prescription where a pharmacist would like to be able to have a good level of confidence that the document is genuine.

Information on specialty imaging including infrared mark text and ultra violet mark text can be found at this webpage: https://www.xerox.com/en-us/digital-printing/secure-printing, which is incorporated herein by reference in its entirety. A design goal of a metameric pair of IR inks, for example, is to appear to be about the same color/pattern under office illumination. That is, text and/or other graphics can become visible with an IR camera.

With certain long term or lifetime documents, a copy is often allowed as proof. One example is a veteran's DD 214 form showing an honorable (or not) discharge. This may be used as proof to apply for, for example, a VA (veterans administration) loan or to get 10% off at Home Depot. It is much easier to alter a copy and thus defraud the e.g., government agency, bank or Home Depot. In most cases watermarks are desired to not be copied.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved printing devices and rendering techniques.

It is yet another aspect of the embodiments to provide for an improved security device such as a watermark used in securing documents.

It also an aspect of the embodiments to provide for an improved IR watermark and a method of producing the IR watermarks.

Is a further aspect of the embodiments to provide for methods, systems and devices that allow for a watermark to be included in an original printed image, wherein the watermark will be mostly/entirely invisible to an image scanner so that a scanned copy of the image will not include the watermark and is therefore straightforward to detect.

It is another aspect of the embodiments to provide for an IR watermark that is destroyed upon copying of the document upon which the IR watermark is contained.

The aforementioned aspects and other objectives and advantages can now be achieved as described herein. In an embodiment, a method for rendering a security mark, can involve: providing a security mark with a metameric pair of infrared inks, wherein a spectral reflectance of the two metameric inks among the metameric pair of inks differs for CMYK for K in infrared, and configuring a first metameric ink among the metameric pair of infrared inks to comprise more K than a second metameric ink among the metameric pair of infrared inks, wherein when a document containing the security mark is scanned, a number of K pixels in the first metameric ink are filtered to destroy the security mark when viewed through an infrared camera.

An embodiment can further involve scanning the document with a scanner wherein the scanner views the first metameric ink and the second metameric ink as close to K, which effectively destroys the security mark.

In an embodiment, the security mark may be a watermark.

In an embodiment, one ink in the metameric pair of infrared inks can reflect more infrared light and other ink in the metameric pair of infrared inks reflects less infrared light.

An embodiment can further involve filtering the number of K pixels in the first metameric ink with a scanner.

An embodiment can involve filtering the number of K pixels in the first metameric ink with a modulation transfer frequency.

An embodiment can involve filtering the number of K pixels in the first metameric ink with a low pass filter.

An embodiment can involve filtering the number of K pixels in the first metameric ink with a modulation transfer frequency of the scanner.

An embodiment can involve encoding at least one of text and graphics in the metameric pair of infrared inks.

In another embodiment, a security apparatus can include a security mark with a metameric pair of infrared inks, wherein a spectral reflectance of the two metameric inks among the metameric pair of inks differs for CMYK for K in infrared, and a first metameric ink configured among the metameric pair of infrared inks to comprise more K than a second metameric ink among the metameric pair of infrared inks. The document containing the security mark can be scanned, wherein a number of K pixels in the first metameric ink are filtered to destroy the security mark when viewed through an infrared camera.

In yet another embodiment, a system for rendering a security mark, can include at least one processor and a memory, the memory storing instructions to cause the at least one processor to perform: providing a security mark with a metameric pair of infrared inks, wherein a spectral reflectance of the two metameric inks among the metameric pair of inks differs for CMYK for K in infrared; and configuring a first metameric ink among the metameric pair of infrared inks to comprise more K than a second metameric ink among the metameric pair of infrared inks, wherein when a document containing the security mark is scanned, a number of K pixels in the first metameric ink are filtered to destroy the security mark when viewed through an infrared camera.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
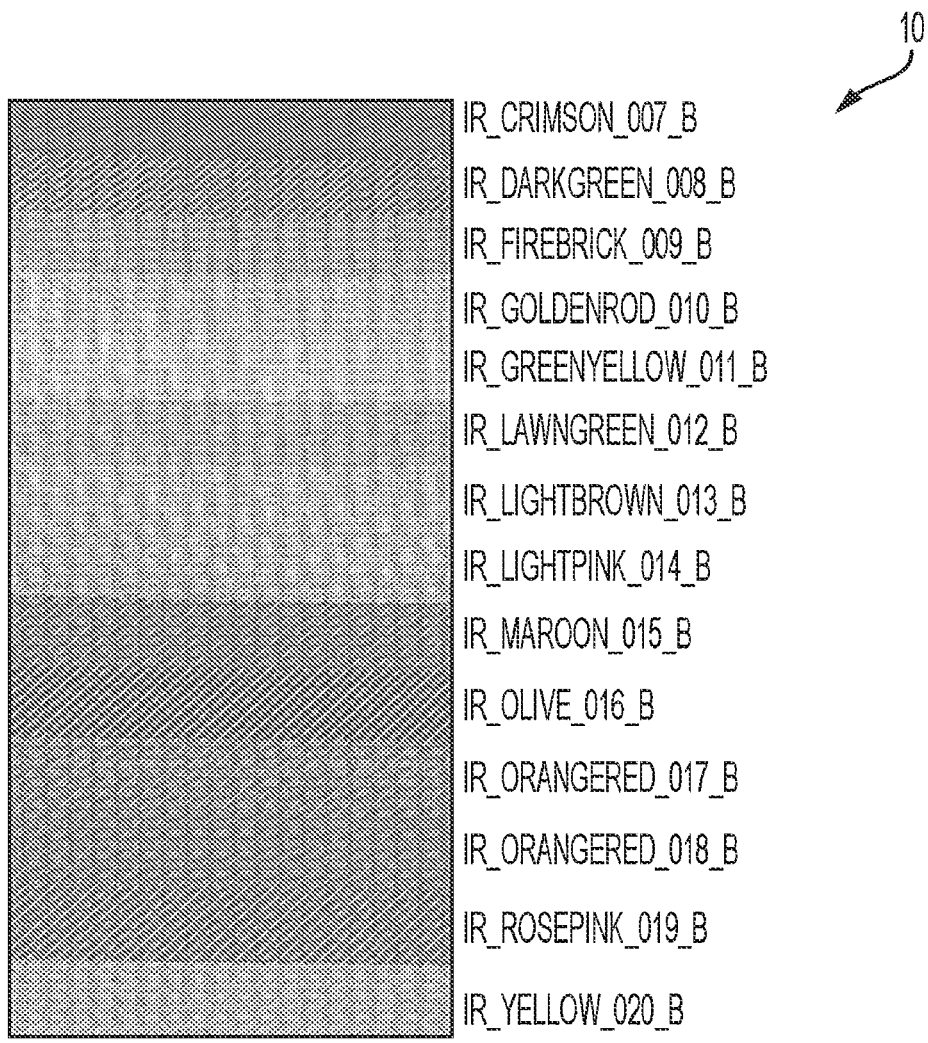
FIG. 1 illustrates an image of an IR product swatch sheet under office illumination.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and can refer to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYK color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. The term "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

Embodiments relate to method, systems and device that include a watermark in an original printed image, where the watermark is mostly/entirely invisible to an image scanner so that a scanned copy of the image will not include the watermark and therefore be straightforward to detect. These embodiments incorporate IR watermark features, wherein a metameric pair of infrared (IR) inks can be used with one ink reflecting more IR light and the other ink reflecting less IR light. For the disclosed embodiments, the spectral reflectance of the two metameric inks differs for CMYK especially for K in IR (K has carbon) so that metameric ink 1 has more K than metameric ink 2.

When the original printed image is scanned, the scanner's MTF (modulation transfer frequency) acts as a low pass filter which filters out enough of the small K pixels in metameric ink 1 to destroy the IR watermark when viewed with an IR camera.

The disclosed embodiments involve a methodology and related devices and systems in which a metameric pair of IR inks is created with one ink that reflects IR light and the other reflects less IR light. A watermark created with the inks is generally invisible under office illumination and becomes visible with an IR camera. There are two steps to help destroy the IR signal during a scan or copy. The carbon-based colors out of CMYK+SPOT can be designed with smaller and/or more scattered patterns so the scanners MTF (Modulation Transfer Function) of the scanner filters out part of the IR absorbing carbon-based colors. The second is to color match with one ink using a greater amount of the IR absorbing colors so the scanner sees about the same IR absorbing color even though one absorbs less.

FIG. 1 illustrates an image 10 of an IR product switch sheet under office illumination. The image 10 depicted in FIG. 1 demonstrates that for a swatch to be considered working or functioning, it should be mostly unreadable.

Figure 2:
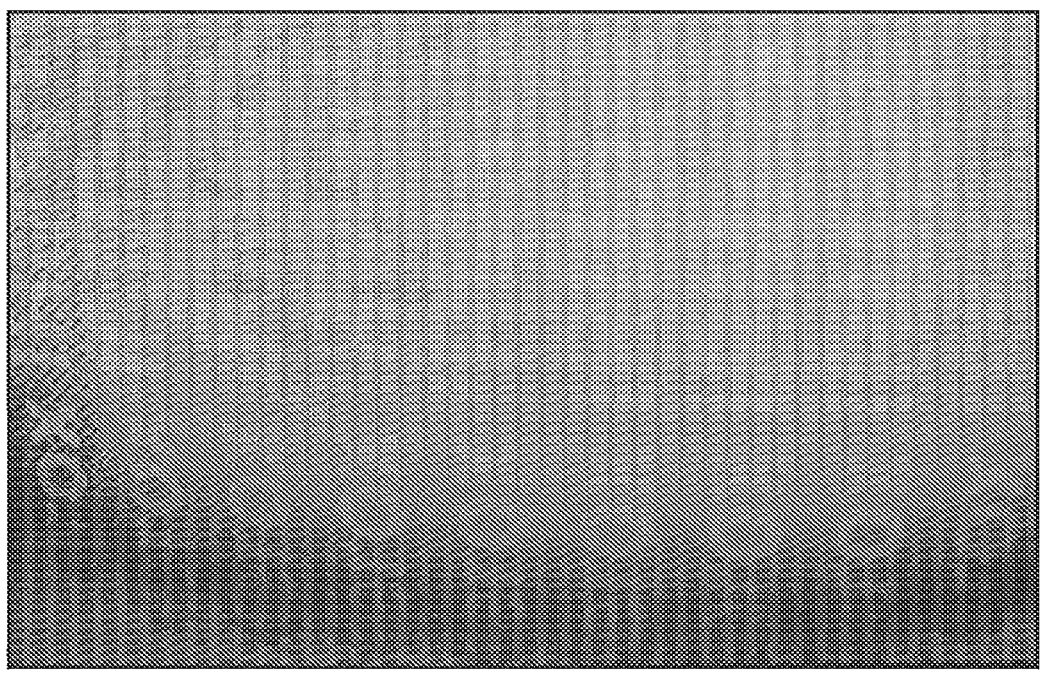
FIG. 2 illustrates an image of a swatch sheet IR camera.
Figure 2:

FIG. 2 illustrates an image 20 of a swatch sheet IR camera. The image 20 depicted in FIG. 2 demonstrates that to be considered working or functioning, each swatch needs to be mostly readable with an IR camera along with meeting the requirements of, for example, the product shown in FIG. 1. Note that the image 10 in FIG. 1 and the image 20 in FIG. 2 are images of the same sheet of paper, although they are rotated from each other.

Figure 3:
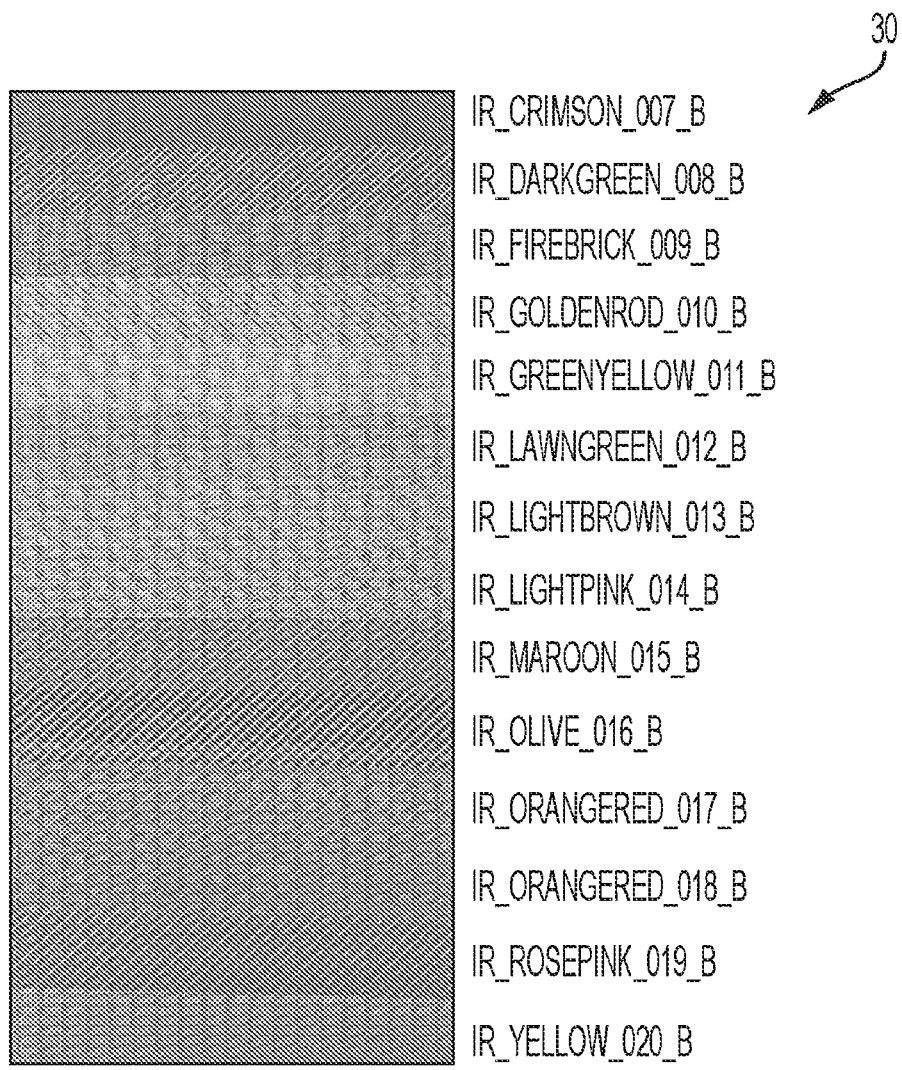
FIG. 3 illustrates an image of an IR product swatch sheet copy under office illumination.

FIG. 3 illustrates an image 30 of an IR product swatch sheet copy under office illumination. The image 30 shown in FIG. 3 demonstrates that most of the swatches are still not readable, meaning a counterfeit copy can pass this check.

Figure 4:
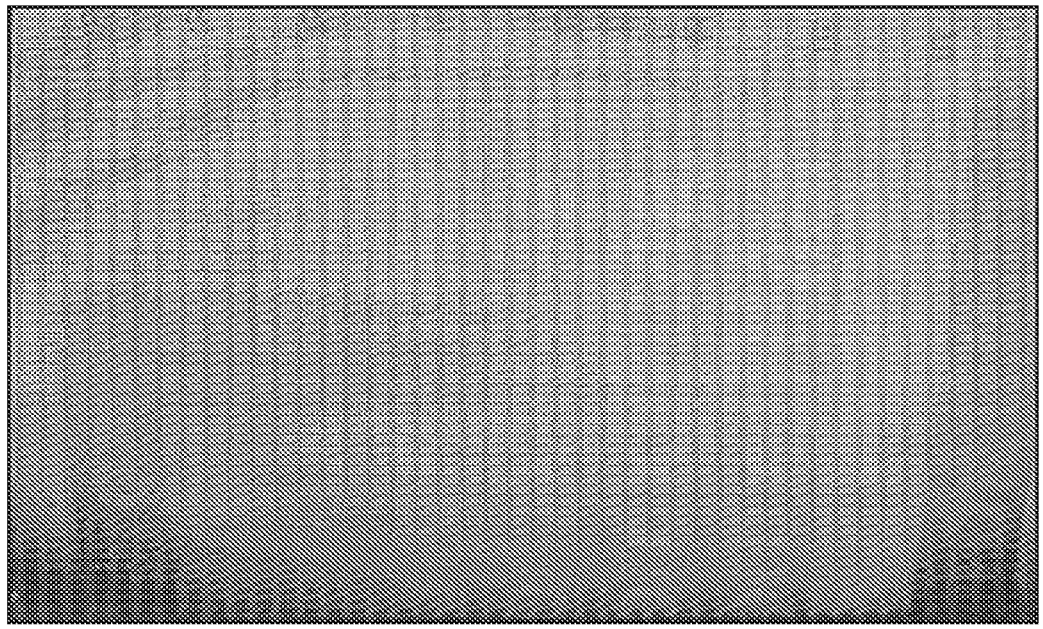
FIG. 4 illustrates an image of an IR product swatch sheet IR camera.

FIG. 4 illustrates an image 40 of an IR product swatch sheet IR camera. Image 40 depicted in FIG. 4 demonstrates that many of the IR swatches are readable with an IR camera, meaning a counterfeit copy may pass both IR checks even though the IR signal may be somewhat degraded. Note that the image 30 in FIG. 3 and the image 49 in FIG. 4 are images of the same sheet of paper, although they are rotated from each other.

Figure 5:
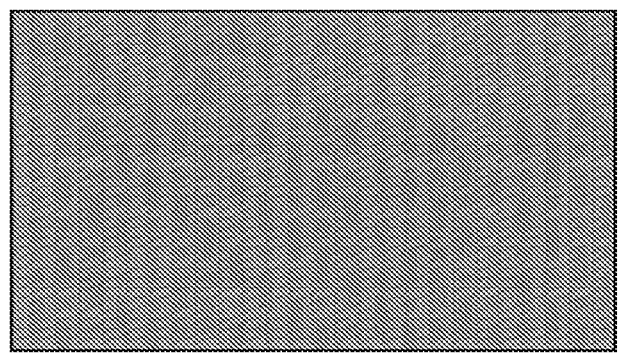
FIG. 5 illustrates an image of another example of an IR security mark.

FIG. 5 illustrates an image 50 of another example of an IR security mark. The image 50 depicted in FIG. 5 demonstrates another style of an IR product, but one which also contains swatches where a copy still passed both checks.

To address the problems demonstrates by the image shown in FIGS. 1-5, a methodology for rendering a security mark (e.g., a watermark) can be implemented according to the following steps:

1) Create a metameric pair of pattern inks where one ink reflects higher in the IR spectrum as compared to the other;
2) In addition, the pair of inks should appear to be a single color/pattern at printed size;
3) Each ink should have a similar Lab (i.e., L*a*b) value prior to bring converted to CMYK/halftoned;
4) Each ink should appear around the same color to a scanner matching the carbon based colors;
5) One ink may take advantage of filtering of high frequency dots via the scanners MTF (modulation transfer frequency); and
6) Encode text and/or graphics in the inks.

Figure 6:
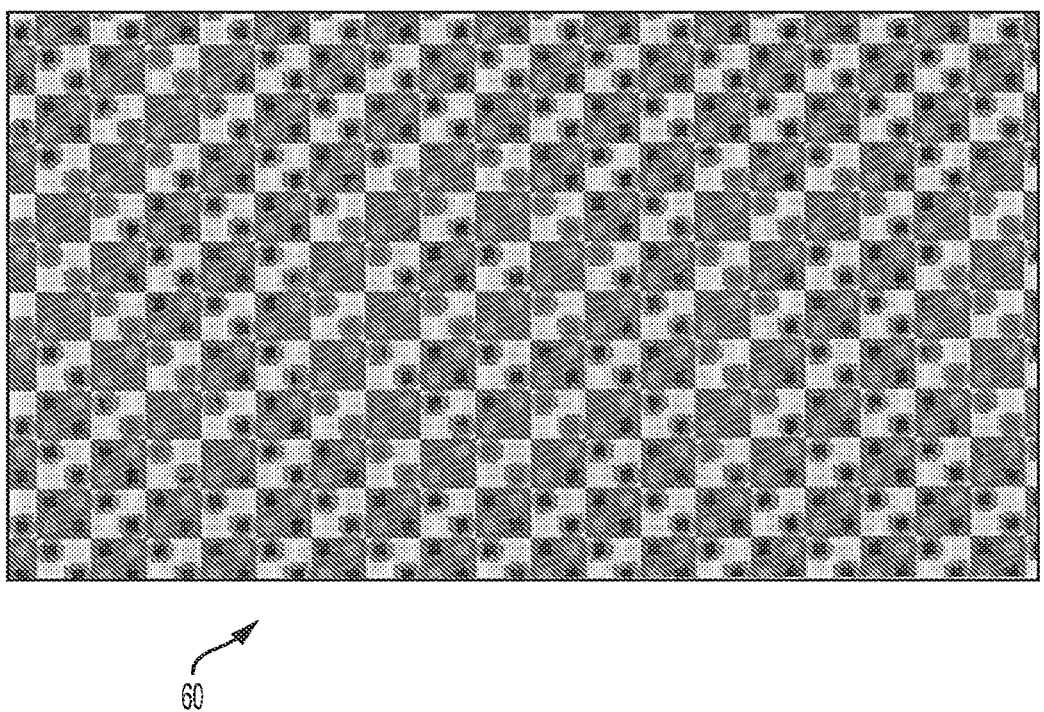
FIG. 6 illustrate an example IR pattern that will not copy, in accordance with an embodiment.

FIG. 6 illustrate an image 60 of an example IR pattern that will not copy, in accordance with an embodiment. That is, this IR pattern can be produced according to one or more of the steps outlined above. The image 60 shown in FIG. 6 takes advantage of the color matching of dark black verses dark gray, which appear around the same to a scanner (e.g., such as the scanners 229 and/or 262 shown in FIG. 12). It also uses fine particles in that same area which can be filtered out by the scanner and which also can degrade the IR signal during a scan or copy.

Figure 7:
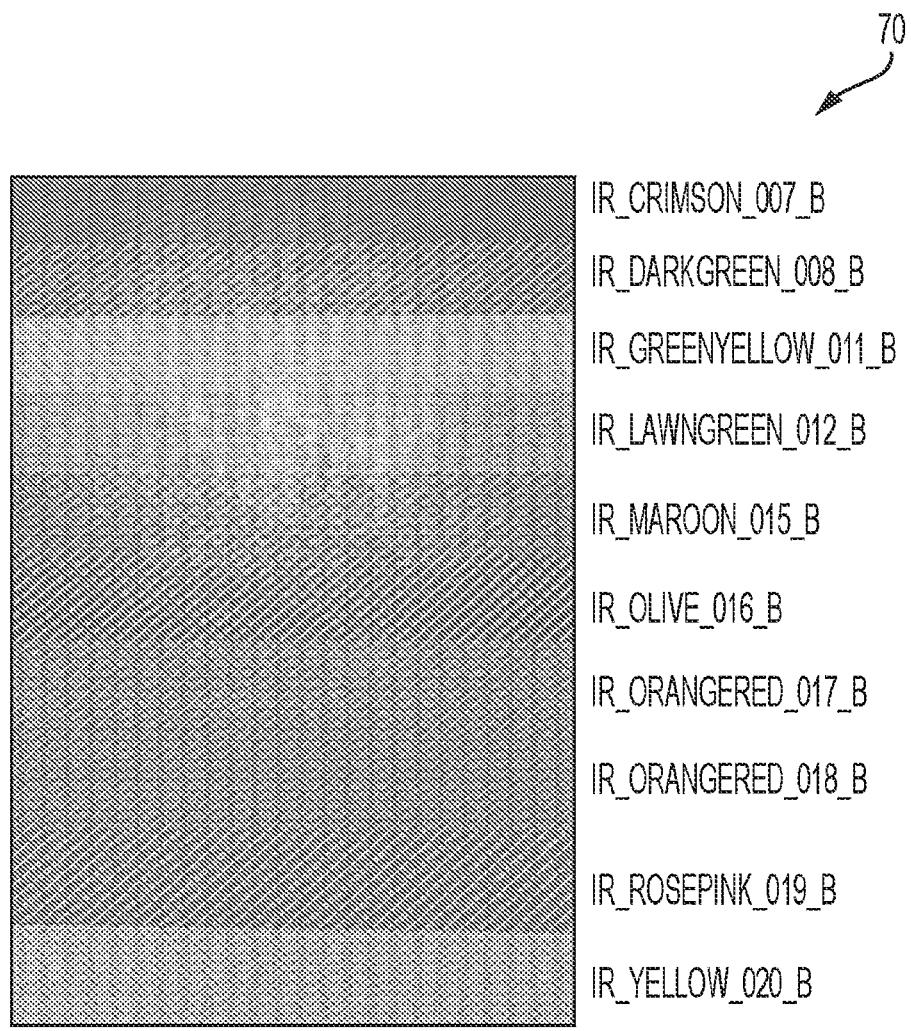
FIG. 7 illustrates an original anti-copy IR swatch, in accordance with an embodiment.

FIG. 7 illustrates an image 70 of an original anti-copy IR swatch, in accordance with an embodiment. The image 70 shown in FIG. 7 is akin to the image 10 depicted in FIG. 1 in that each swatch is working if they are mostly unreadable.

Figure 8:
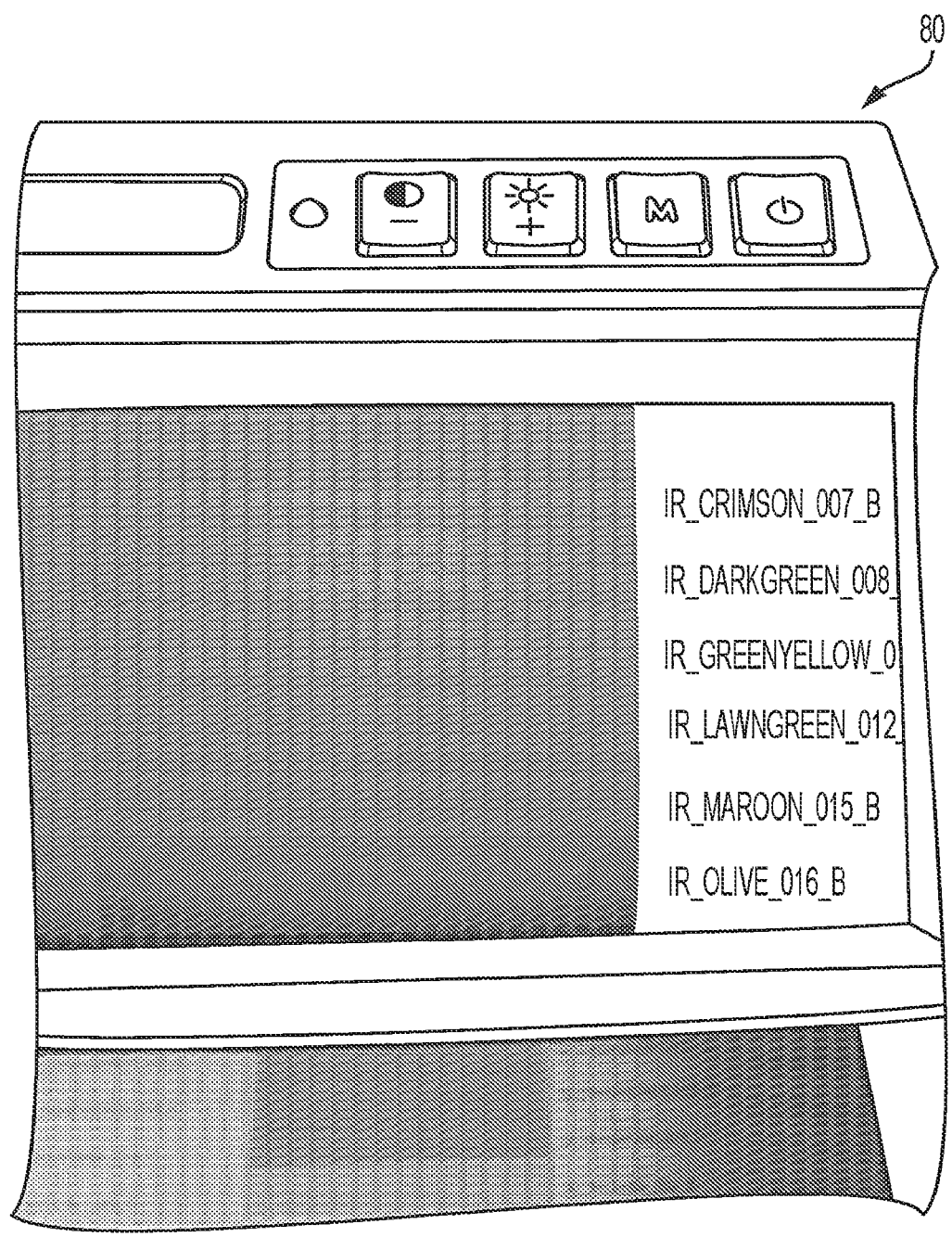
FIG. 8 illustrates an image of the anti-copy IR swatch subject to an IR camera, in accordance with an embodiment.

FIG. 8 illustrates an image 80 of the anti-copy IR swatch subject to an IR camera. The image 80 shown in FIG. 8 is akin to the image 20 depicted in FIG. 2 in that each swatch is working if it is mostly readable.

Figure 9:
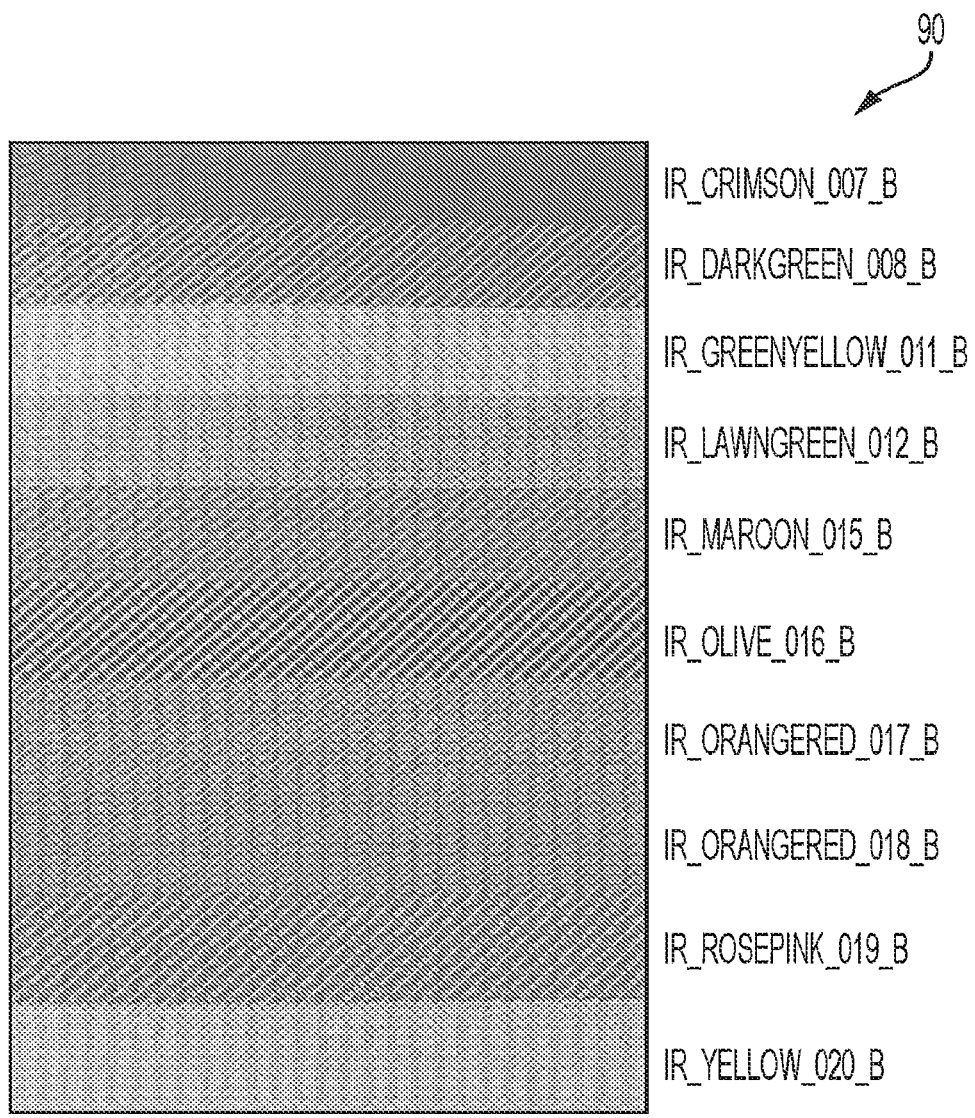
FIG. 9 illustrates a copy of image shown in FIG. 7, in accordance with an embodiment.

FIG. 9 illustrates an image 90 that is a copy of the image shown in FIG. 7, in accordance with an embodiment. The image 90 is akin to the image 30 depicted in FIG. 3 in that it is working if it is mostly unreadable.

Figure 10:
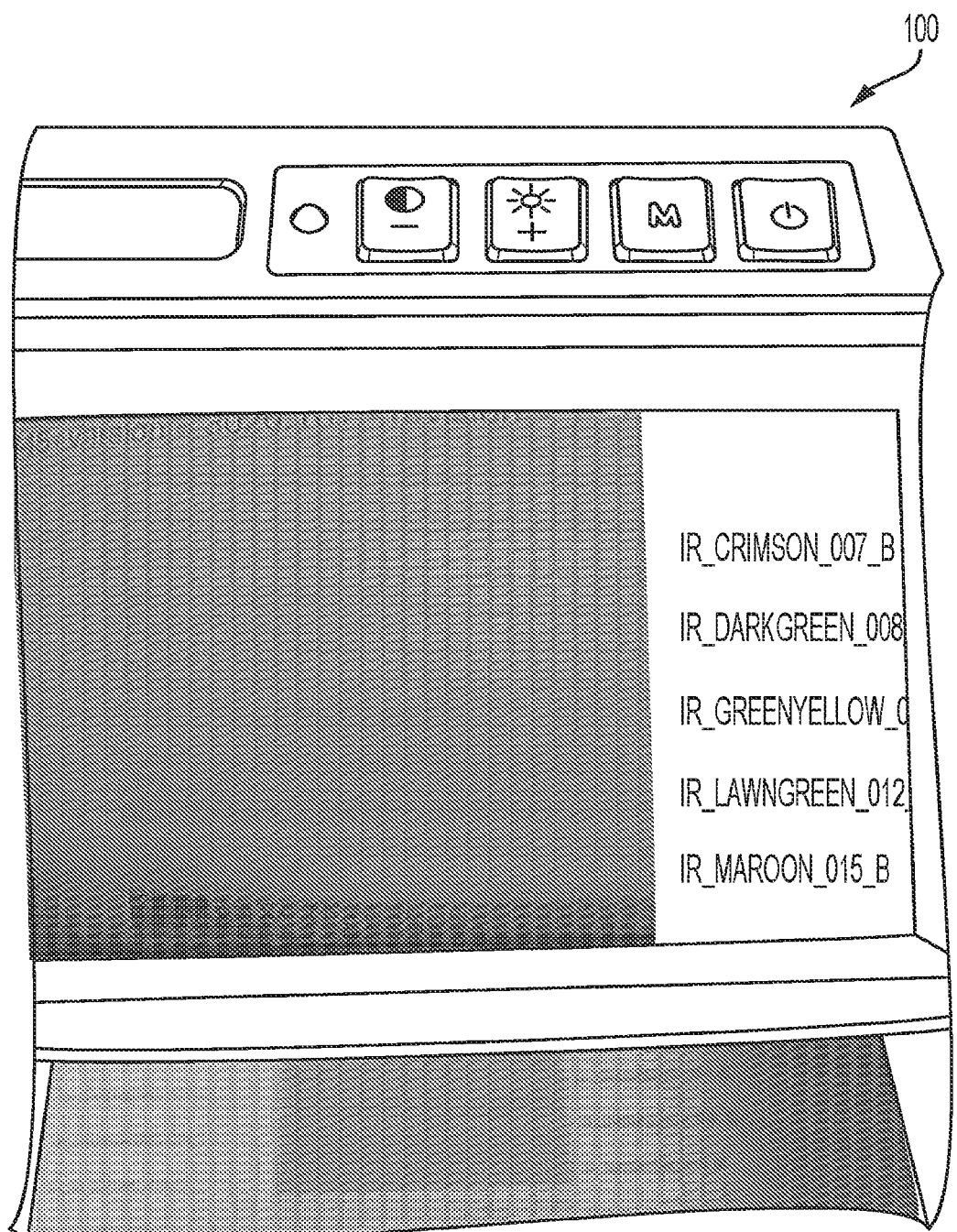
FIG. 10 illustrates the copy of image shown in FIG. 9 taken with an IR camera.

FIG. 10 illustrates an image 100 that is a copy of the image 90 shown in FIG. 9 taken with an IR camera. The image 100 is akin to image 40 of FIG. 4 in that each swatch is working if it is mostly unreadable, which is unlike image 40 of FIG. 4 as the IR signal is destroyed.

Figure 11:
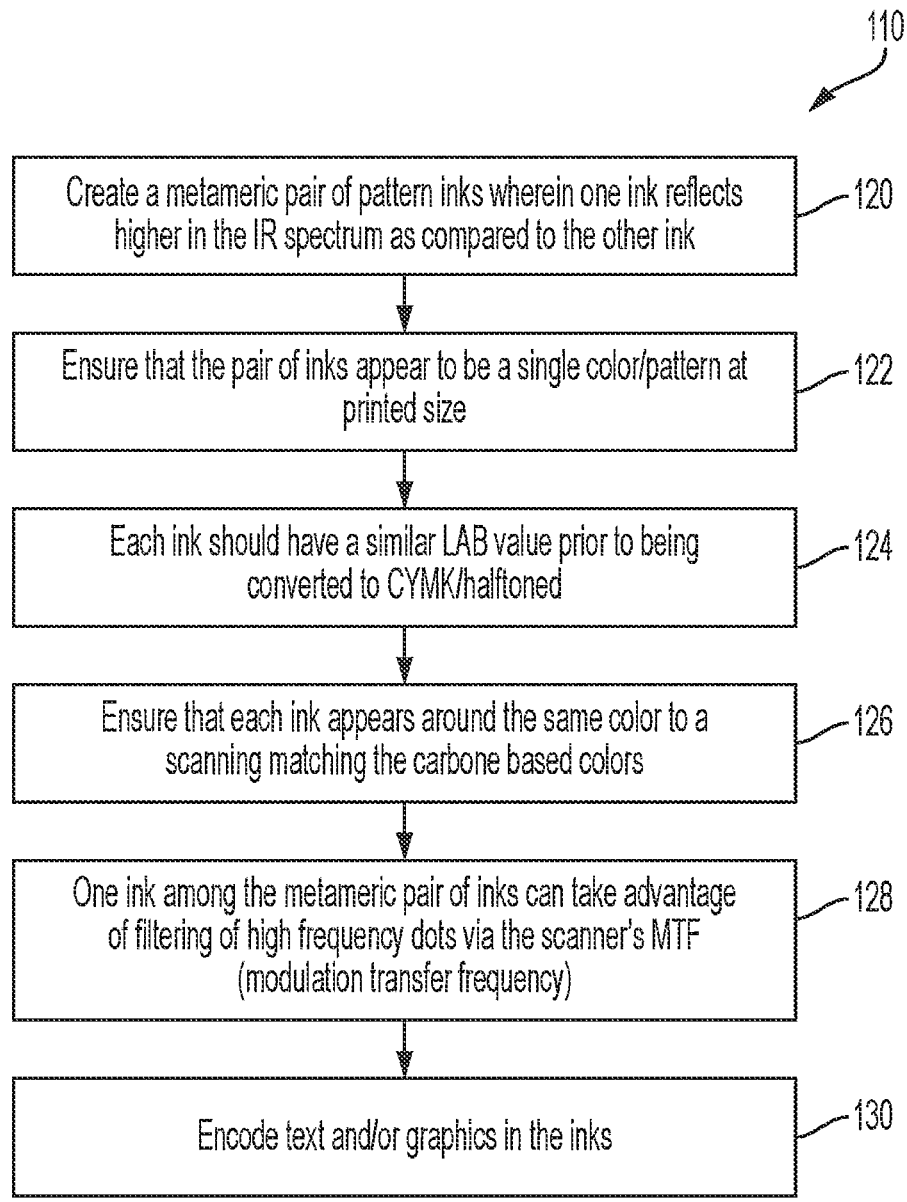
FIG. 11 illustrates a high-level flow chart of operation depicting logical operational steps of a method for creating and rendering an IR watermark, in accordance with an embodiment.

FIG. 11 illustrates a high-level flow chart of operation depicting logical operational steps of a method 110 for rendering a security mark, in accordance with an embodiment. It should be appreciated that the method 110 depicted in FIG. 11 can provide a methodology for creating and rendering an IR watermark for use in document security applications, wherein the IR watermark is destroyed upon copying of the IR watermark. This may involve copying of the IR watermark itself and/or the document upon which the IR watermark has been rendered.

As indicated at block 120, a step, operation or instruction can be implemented in which a metameric pair of pattern inks is created, wherein one ink among the metameric pair of pattern inks reflects higher in the IR spectrum as compared to the other ink. Next, as shown at block 122, a step, operation or instruction can be implemented to ensure that the pair of inks (i.e., the metameric pair of pattern inks) should appear to be a single color/pattern at a printed size. Thereafter, as shown at block 124, a step, operation or instruction can be implemented to ensure that each ink among the metameric pair of pattern inks should have a similar L*a*b value prior to being converted to CMYK/halftoned.

Next, as shown at block 126, a step, operation or instruction can be implemented to ensure that each ink among the metameric pair of pattern inks should appear around the same color to a scanner matching the carbon based colors. Note that an example of the scanner is the scanner 229 and/or the scanner 262 shown in FIG. 12.

Then, as shown at block 128, a step, operation or instruction can be implemented to allow one ink among the metameric pair of pattern inks to take advantage of filtering of high frequency dots via the scanner's MTF (modulation transfer frequency. Finally, as depicted at block 130, a step, operation or instruction can be implemented to encode text and/or graphics in the inks.

Note that besides filtering out of small/scattered black dots via MTF using areas that the scanner reads, about the same color can be used (e.g., CMYK 100% will absorb and CMY 100% with K 50% will absorb less, thereby creating a watermark in IR). The scanner sees both as close to K so that the IR watermark is destroyed.

Figure 12:
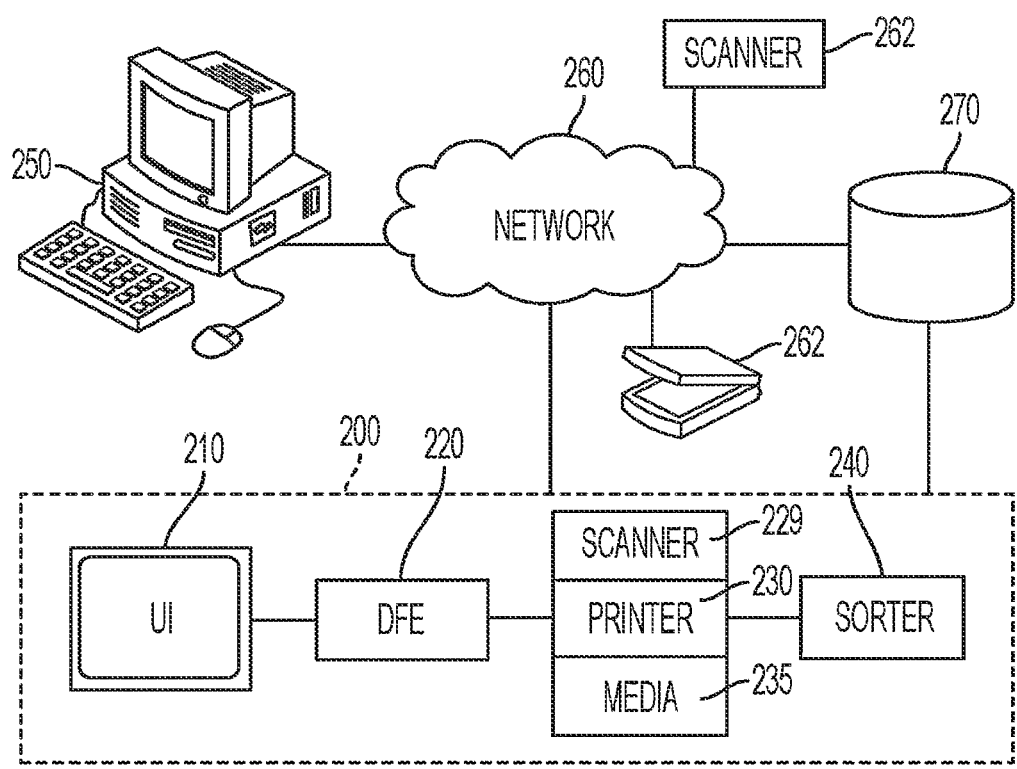
FIG. 12 illustrates a block diagram of a printing system suitable for implementing one or more of the disclosed embodiments.

With reference to FIG. 12, a printing system (or image rendering system) 200 may be suitable for implementing various aspects of the exemplary embodiments described herein is illustrated. In some embodiments, the printing system 200 can implement rendering operations such as scanning a document via a scanner and printing a document via a printer, wherein the document includes the disclosed two-layer correlation mark with a variable data hiding layer.

The printing system 200 can be used to embed a hidden/invisible image or text as discussed previously into the white space of a digital document, as well as implementing a flexible system/method to convert the invisible item into a visible item. The printing system 200 can represent each invisible item in a single color that is very close to white, such as using the least significant bit of cyan, which is not discernable from white by the human eye. The printing system 200 and/or in combination with a software application or a web service may be more color sensitive and can correctly recognize the presence of the hidden item.

The printing system 200 can use the previously discussed transformation table, which can be configured to define how to convert the color of the hidden item so that it can be discerned by the human eye, instead of hardcoding the transformation rules. The output of the printing system 200 can be a representation of the document where the item is plainly visible to a human.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. Such a scanner may also be incorporated into, for example, a printing system such as the printing system 200 shown in FIG. 12. For example, the scanner 229 is shown in FIG. 12 as a part of the printing system 200. Alternatively, or in addition to the scanner 229 included as a part of the printing system 100, a scanner may be implemented as a separate scanner 262 also depicted in FIG. 12, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. In some embodiments, one or more color sensors (not shown) may be embedded in the printer paper path associated with the printer 230.

Figure 13:
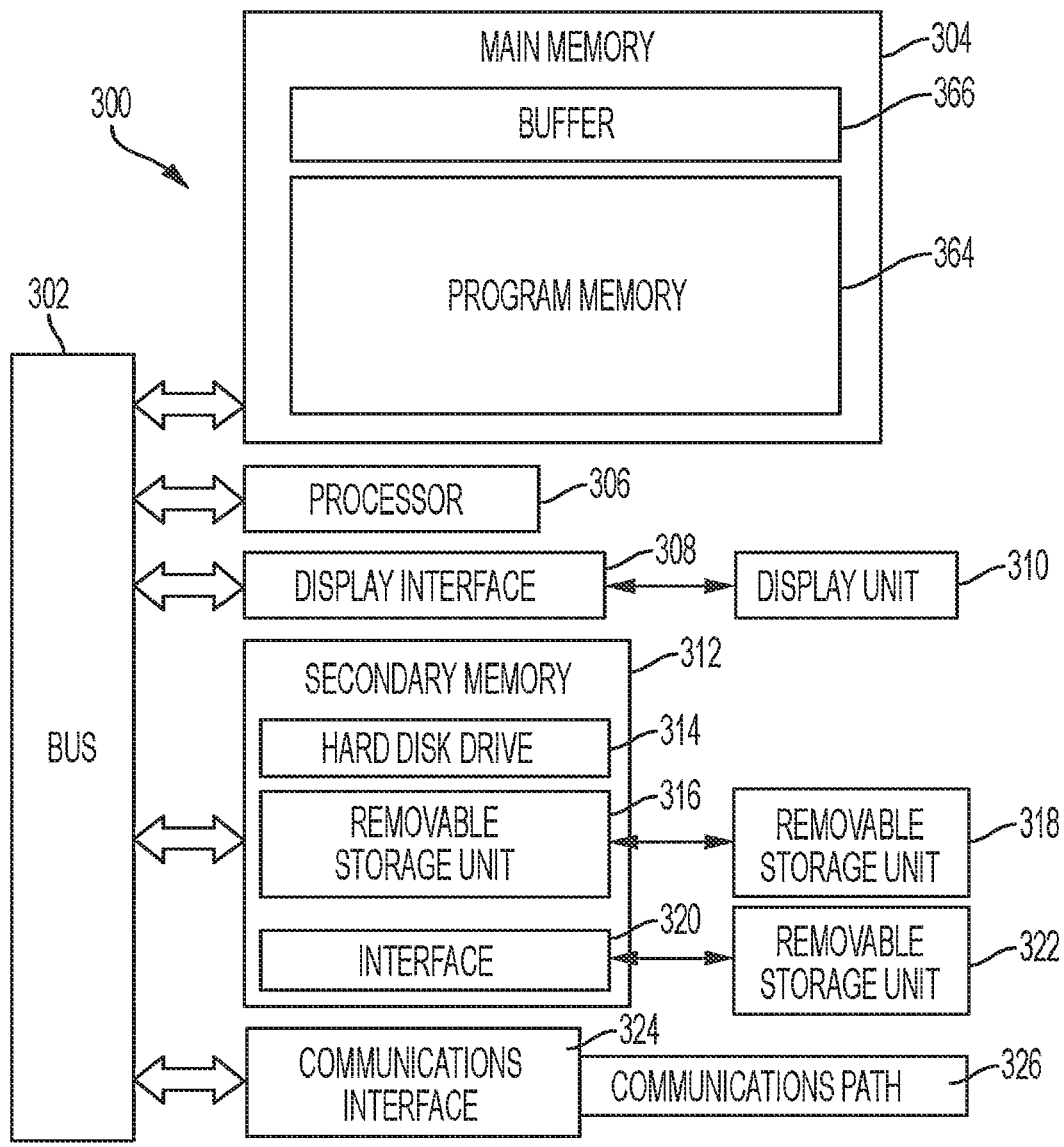
FIG. 13 illustrates a block diagram of a digital front-end controller useful for implementing one or more of the disclosed embodiments.

With respect to FIG. 13, an exemplary DFE (Digital Front End) controller 300 is shown in greater detail. The DFE controller 300 can include one or more processors, such as processor 306 capable of executing machine executable program instructions. The processor 306 can function as a DFE processor.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data. The UI 210 shown in FIG. 12 may be displayed as a graphical user interface (GUI) via, for example, the display 310 shown in FIG. 12.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 12 and/or the DFE controller 300 shown in FIG. 13. A "module" can perform the various steps, operations or instructions discussed herein, such as the steps or operations discussed herein such as, for example, the steps, operations or instructions of method 110 of FIG. 11.

The method 110 shown in FIG. 11, for example, may be implemented, in part, in a computer program product comprising a module that may be executed by, for example, DFE controller 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 12).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a security mark, comprising:
   providing a security mark with a metameric pair of infrared inks, wherein a spectral reflectance of the two metameric inks among the metameric pair of inks differs for CMYK for K in infrared; and
   configuring a first metameric ink among the metameric pair of infrared inks to comprise more K than a second metameric ink among the metameric pair of infrared inks, wherein when a document containing the security mark is scanned, a number of K pixels in the first metameric ink are filtered to destroy the security mark when viewed through an infrared camera.

2. The method of claim 1 further comprising scanning the document with a scanner wherein the scanner views the first metameric ink and the second metameric ink as close to K, which effectively destroys the security mark.

3. The method of claim 1 wherein the security mark comprises a watermark.

4. The method of claim 1 wherein one ink in the metameric pair of infrared inks reflects more infrared light and other ink in the metameric pair of infrared inks reflects less infrared light.

5. The method of claim 1 further comprising filtering the number of K pixels in the first metameric ink with a scanner.

6. The method of claim 1 further comprising filtering the number of K pixels in the first metameric ink with a modulation transfer frequency.

7. The method of claim 1 further comprising filtering the number of K pixels in the first metameric ink with a low pass filter.

8. The method of claim 7 further comprising filtering the number of K pixels in the first metameric ink with a modulation transfer frequency of the scanner.

9. The method of claim 1 further comprising encoding at least one of text and graphics in the metameric pair of infrared inks.

10. A security apparatus, comprising:
    a security mark with a metameric pair of infrared inks, wherein a spectral reflectance of the two metameric inks among the metameric pair of inks differs for CMYK for K in infrared; and
    a first metameric ink configured among the metameric pair of infrared inks to comprise more K than a second metameric ink among the metameric pair of infrared inks, wherein when a document containing the security mark is scanned, a number of K pixels in the first metameric ink are filtered to destroy the security mark when viewed through an infrared camera.

11. The security apparatus of claim 10 further comprising a scanner for scanning the document wherein the scanner views the first metameric ink and the second metameric ink as close to K, which effectively destroys the security mark.

12. The security apparatus of claim 10 wherein the security mark comprises a watermark.

13. The security apparatus of claim 10 wherein one ink in the metameric pair of infrared inks reflects more infrared light and other ink in the metameric pair of infrared inks reflects less infrared light.

14. The security apparatus of claim 11 wherein the scanner filters the number of K pixels in the first metameric ink.

15. The security apparatus of claim 10 further comprising a modulation transfer frequency function for filtering the number of K pixels in the first metameric ink.

16. The security apparatus of claim 10 further comprising a lower pass filter for filtering the number of K pixels in the first metameric ink.

17. The security apparatus of claim 11 wherein the number of K pixels in the first metameric ink is filtered with a modulation transfer frequency of the scanner.

18. The security of claim 10 wherein at least one of text and graphics in the metameric pair of infrared inks is encoded.

19. A system for rendering a security mark, comprising:
    at least one processor and a memory, the memory storing instructions to cause the at least one processor to perform:
    providing a security mark with a metameric pair of infrared inks, wherein a spectral reflectance of the two metameric inks among the metameric pair of inks differs for CMYK for K in infrared; and
    configuring a first metameric ink among the metameric pair of infrared inks to comprise more K than a second metameric ink among the metameric pair of infrared inks, wherein when a document containing the security mark is scanned, a number of K pixels in the first metameric ink are filtered to destroy the security mark when viewed through an infrared camera.

20. The system of claim 19 further comprising a scanner for scanning the document, wherein the scanner views the first metameric ink and the second metameric ink as close to K, which effectively destroys the security mark.

* * * * *